United States Patent [19]
Horstmann

[11] Patent Number: 6,009,401
[45] Date of Patent: Dec. 28, 1999

[54] RELICENSING OF ELECTRONICALLY PURCHASED SOFTWARE

[75] Inventor: Cay S. Horstmann, Cupertino, Calif.

[73] Assignee: Preview Systems, Inc., Cupertino, Calif.

[21] Appl. No.: 09/055,269

[22] Filed: Apr. 6, 1998

[51] Int. Cl.⁶ ........................................ G06F 17/60
[52] U.S. Cl. .................... 705/1; 705/44; 380/4; 380/25
[58] Field of Search ............ 705/1, 8, 44; 380/4, 380/25, 21, 23, 30, 49, 50; 713/200, 201, 202, 502

[56] References Cited

U.S. PATENT DOCUMENTS

| | | | |
|---|---|---|---|
| 5,390,297 | 2/1995 | Barber et al. | 364/280 |
| 5,553,143 | 9/1996 | Ross et al. | 380/25 |
| 5,754,763 | 5/1998 | Bereiter | 380/4 |
| 5,790,664 | 8/1998 | Coley et al. | 380/4 |

*Primary Examiner*—James P. Trammell
*Assistant Examiner*—Demetra R. Smith
*Attorney, Agent, or Firm*—Burns, Doane, Swecker & Mathis LLP

[57] ABSTRACT

The present invention, generally speaking, provides a mechanism for use in conjunction with Electronic Software Distribution (ESD) that provides purchase documentation and that allows for convenient re-download and relicensing of soft-ware, including old software versions. In accordance with one embodiment of the invention, a relicensing manager software utility installed on an end user's machine interacts with one or more of a remote publisher site, a license clearing house and a merchant site to relicense, transfer, or obtain a refund for a software product. The term "software product" is used to refer to both executable software programs and to electronic content (e.g., pictures, recordings, etc.) The role of the publisher site is to archive both current and old versions of software products. The role of the license clearinghouse is to keep a count of licensed installations and to grant or deny permission to relicense based on the count. The role of the product server is to effect a credit transaction and, according to the terms of the end-user license, to refund the purchase price of a recently purchased software product for which the customer has requested license revocation. The relicensing manager refers to a license certificate stored on the end user's machine during installation and, preferably, backed-up on floppy disk or some other permanent storage medium. The license certificate describes license policies and server locations which are then followed by the relicensing manager.

19 Claims, 3 Drawing Sheets

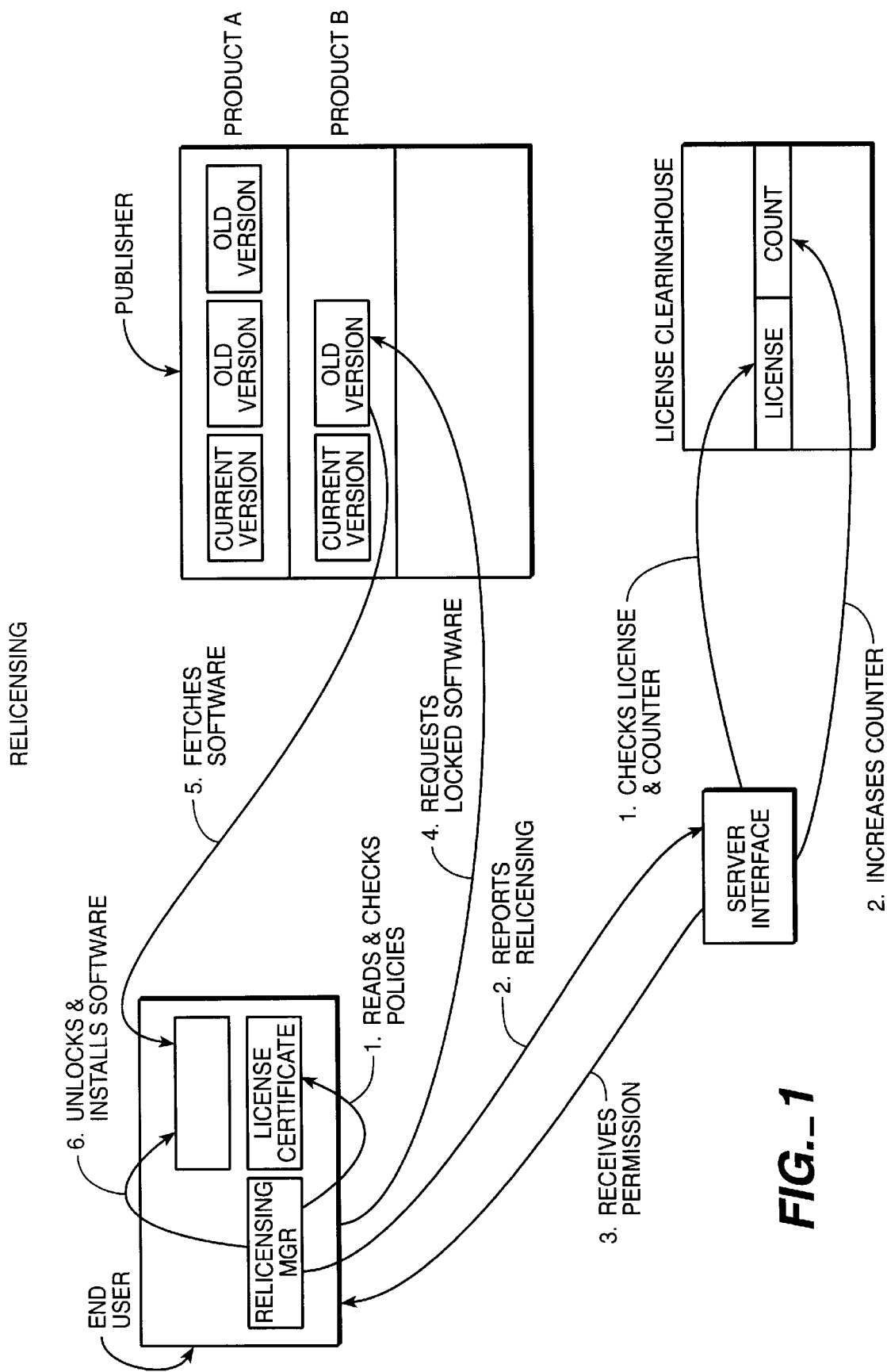
FIG._1

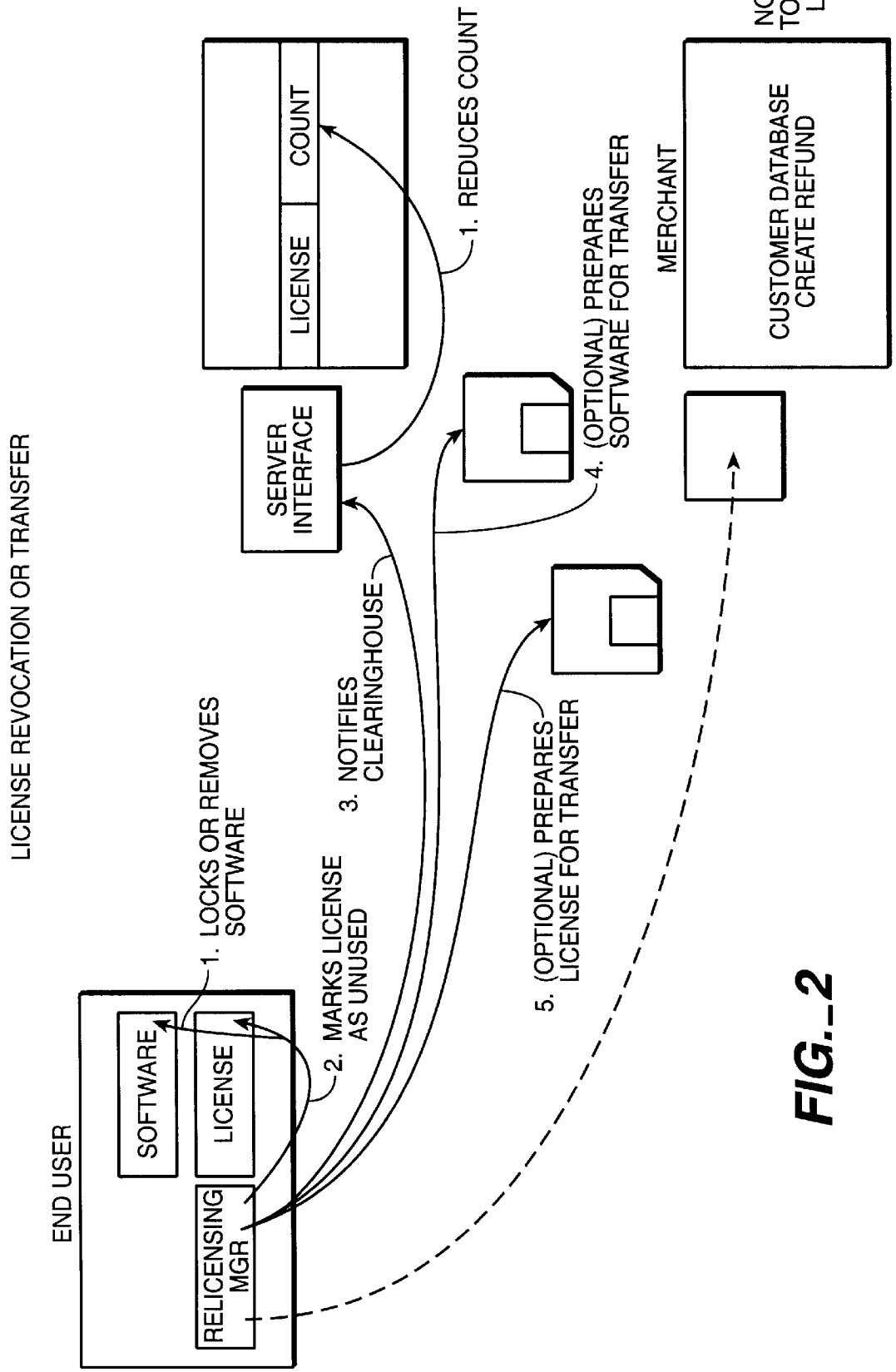
FIG._2

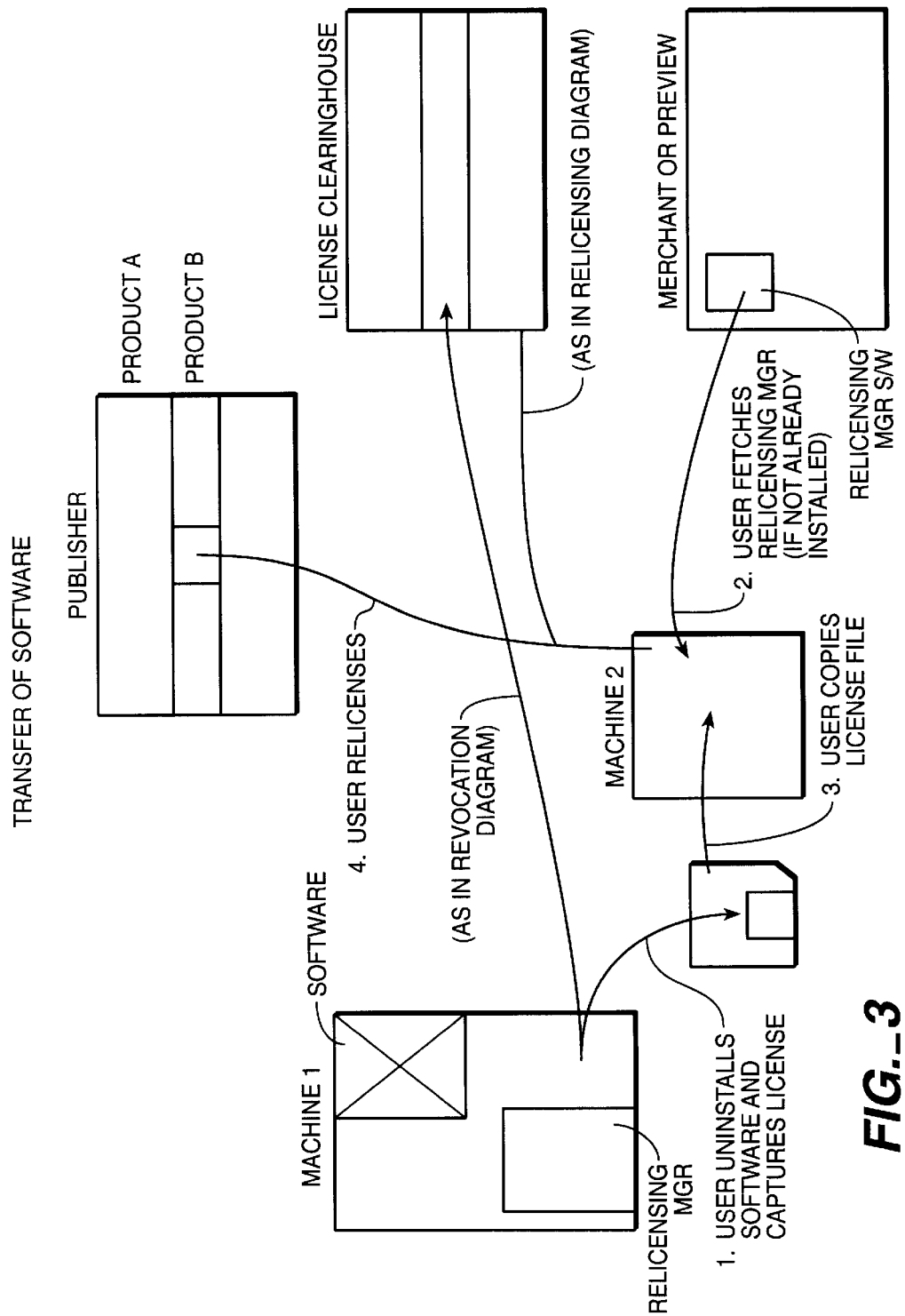
FIG._3

RELICENSING OF ELECTRONICALLY PURCHASED SOFTWARE

BACKGROUND OF THE INVENTION

1. Field of the Invention

The present invention relates to electronic software distribution (ESD) and licensing.

2. State of the Art

Conventionally, software has been distributed in shrink-wrap form. That is, disk copies of a piece of software have been packaged and shrinkwrapped, usually together with user's manuals. Boxes of shrinkwrapped software are then moved through distribution channels, with payment being made in the usual commercial fashion.

With the widespread use of CD ROMs, expensive manuals are increasingly being dispensed with in favor of on-line manuals, i.e., manuals stored on CD ROM. The software and its documentation have been merged together. Furthermore, with the proliferation of inexpensive, high capacity hard drives, either on a stand-alone computer or a network server, and widespread Internet access (through increasingly high speed "pipes"), it is now possible to distribute software electronically by pre-loading software on a hard drive or allowing customers to download the software from a server such as an "electronic storefront."

Software publishers, however, often do not wish to open and maintain a "storefront" for electronic software distribution, and often do not have sufficient market reach or presence to effectively distribute the software that they have produced. A software publisher may therefore wish to "team up" with one or more "channel partners" (such as on-line stores) in order to effectively carry out electronic software distribution. In such an arrangement, the software publisher puts a software product within the possession and control of one or more (and possibly hundreds of) channel partners.

To facilitate electronic software distribution, clearinghouses have emerged. A clearinghouse functions as a kind of escrow agent for the software publisher and channel partners. Software products for electronic distribution are locked (using encryption). The clearinghouse holds unlock keys for software products and reports to the other parties whenever an unlock key is requested by and released to a customer. The clearinghouse typically also receives payment from the customer and credits the account of the appropriate channel partner. (Although presently clearinghouses and software publishers are typically separate entities, the clearinghouse function of electronic purchase and payment may be performed by any entity, including the software publisher itself. The term "clearinghouse" as used herein therefore refers to the entity performing the clearinghouse function.)

Electronic software distribution may follow a buy-before-you-try (Buy/Try) model or a try-before-you-buy (Try/Buy) model. Buy/Try is the conventional model used in packaged software distribution: the customer must first buy the package before the customer is able to use it. In the Try/Buy model, the customer is allowed to try the software for a period of time before being required to either buy the software or discontinue use of the software. Try/Buy can operate to the advantage of both the customer (allowing the customer to become acquainted with the product before deciding whether to buy it) and the software publisher (affording more customers an opportunity to try and ultimately buy the product). Try/Buy, however, does introduce further complexity into electronic software distribution, both with respect to security and payment processing. The Software Publishers Association has issued guidelines for Try/Buy electronic software distribution, available at the Web page http://www.spa.org.

Wrapper technology providers are responsible for providing secure encryption technology for Buy/Try and Try/Buy purchases. In the case of Try/Buy, the user downloads and installs the product The product is altered in such a way that the potential customer can use the product a limited number of times, a limited amount of time, or is functionally "crippled" in some way. At the end of the software period, the user either purchases the product or deletes the "wrapped" version. If the product is purchased, the clearinghouse provides the customer a key that "breaks the Try/Buy guard" and permanently installs the product.

Despite growing commercial interest in ESD, various impediments to ESD exist. The purchaser is not provided with any ready proof of purchase as might be required to obtain reimbursement (in the case of software purchased for company use). Furthermore, the software is not provided in permanent form. If a need arises to reinstall the software (e.g., because of hardware or software failure or hardware upgrade), no convenient, reliable mechanism is provided to accomplish the same. Archiving a setup file set, for example, is both inconvenient and unavailing, since reinstallation results only in a trial version of the software, not a paid-up version. Even if the software is programmed to, upon purchase, create a paid-up program archive, a high-capacity storage medium is required, and the medium may be easily mislaid, damaged or lost. The possibility exists of re-downloading the software. However, the typical consumer will have no record of where to software was obtained from and hence where to find the software again. Furthermore, typically only the current version of the software will be available for download. If a consumer has had a older version, an upgrade fee may be charged for upgrading to the current version. The consumer may not want to upgrade at all, since there often exist compatibility problems between versions, let alone pay an upgrade fee.

Other problems arise in moving the software from one machine to another, for example when the consumer gets a new computer. To avoid software theft, electronically distributed software is often bound to a particular machine by computing a quantity known as a "machine ID," either from a serial number of one of the machine's components that is known to be unique or from a sufficient number of machine characteristics such that the ID is statistically unique. If the software is moved to another machine, the software recognizes the change in machines and will not run. Although machine binding provides protection against illegitimate copying of software, it also in many instances prevents legitimate use of the software.

What is needed, then, is a mechanism that overcomes the foregoing problems and preferably one that make software purchase using ESD more attractive than the purchase of shrink-wrapped software.

SUMMARY OF THE INVENTION

The present invention, generally speaking, provides a mechanism for use in conjunction with Electronic Software Distribution (ESD) that provides purchase documentation and that allows for convenient re-download and relicensing of software, including old software versions. In accordance with one embodiment of the invention, a relicensing manager software utility installed on an end user's machine interacts with one or more of a remote publisher site, a license clearing house and a merchant site to relicense, transfer, or obtain a refund for a software product. The term "software product" is used to refer to both executable software programs and to electronic content (e.g, pictures, recordings, etc.) The role of the publisher site is to archive both current and old versions of software products. The role of the license clearinghouse is to keep a count of licensed installations and to grant or deny permission to relicense based on the count. The role of the product server is to effect a credit transaction and, according to the terms of the end-user license, to refund the purchase price of a recently purchased software product for which the customer has requested license revocation. The relicensing manager refers to a license certificate stored on the end user's machine during installation and, preferably, backed-up on floppy disk or some other permanent storage medium. The license certificate describes license policies and server locations which are then followed by the relicensing manager.

BRIEF DESCRIPTION OF THE DRAWING

The present invention may be further understood from the following description in conjunction with the appended drawing. In the drawing:

FIG. 1 is a diagram illustrating a relicensing transaction;

FIG. 2 is a diagram illustrating a refund and revocation transaction; and

FIG. 3 is a diagram illustrating a transfer transaction.

DETAILED DESCRIPTION OF THE PREFERRED EMBODIMENTS

No single standard presently exists for Electronic Software Distribution (ESD). One method of ESD suitable for use with the present invention is described in U.S. patent application Ser. No. 08/921,394 entitled Multi-tier Electronic Software Distribution, filed Aug. 29, 1997 and incorporated herein by reference. As described therein, an executable program is injected with protector code that allows for limited trial of the software. A license certificate is stored on the user's machine and includes, for example, the following information:

TABLE 1

License Certificate Structure

Name and address of licensee
Cryptographic unlock code
Merchant information
Version of software and retrieval information for relicensing
License clearinghouse address
License terms
Digital signature During trial, the protector module checks the license terms and checks trial parameters stored within the protector module. If the parameters are within the license terms, then trial of the software is allowed. When the software is purchased, the cryptographic unlock key is used to authenticate the purchase and optionally remove the guard code.

For purposes of the following description, it will be assumed that an end user's machine has installed on it a license certificate and the relicensing manager. These components will typically have been installed during original installation of a software product. In the event the machine's hard drive fails, however, these components may need to be reinstalled. The relicensing manager is preferably freely downloadable from the ESD technology provider or a channel partner's Web site. The license certificate is preferably backed up by the end user onto a floppy disk or other permanent storage medium. However, in an emergency, it may be retrieved from the clearinghouse or merchant by supplying personal information and information about the product purchased and the approximate purchase date or by referring to a license number on a printed receipt. The relicensing manager preferably provides an interface to query for this information, connect to the clearinghouse or merchant and retrieve the license certificate if a matching purchase record can be found. The relicensing manager provides for proper reinstallation of the license certificate.

Referring now to FIG. 1, assume that the end user wishes to relicense the software and reinstall it on the same machine on which it has previously been installed. To do so, the license manager first checks relicensing policies as stored within the license terms portions of the license certificate. Assuming relicensing is allowed, then the relicensing manager connects (through a clearinghouse-specific server interface) to the license clearinghouse. The license clearinghouse server checks a count of licensed installations for the particular license certificate. Typically, the terms of a license will allow for a limited number of reinstallations. If, based on the current count, further licensed installations are allowed, then the license clearinghouse server increments the count and sends permission to the relicensing manager, which receives permission to proceed with relicensing.

The relicensing manager then connects to the publisher site and request the locked software of the appropriate version. Preferably, the publisher site archives old versions of the software program, allowing a user to relicense a previously licensed version for free instead or pay an upgrade fee to upgrade to the most current version. The relicensing manager fetches the software, installs the software on the user's machine and updates the license certificate. Relicensing is then complete. Alternatively, the publisher may contract out the hosting of the software versions to a distributor or other entity. In that situation, the clearinghouse instructs the relicensing manager to connect to the product server that hosts the software to be downloaded.

Referring to FIG. 2, assume instead that the user, having purchased the software, is dissatisfied with the software and wishes to return it for a refund. The relicensing manager first locks or removes the software and marks the license as revoked. The relicensing manager then connects through a server interface to the merchant site and request a refund. Assuming the request conforms to a refund policy of the merchant, a refund is created based on information stored in a customer database. Then the merchant site connects to the license clearinghouse and instructs the license clearinghouse to revoke the license, e.g., by deleting the license entry or setting the count to a predetermined value indicating revocation.

Referring to FIG. 3, assume now that the user wishes to transfer the software to a different machine. First, the user runs the relicensing manager to uninstall the software and to capture the license, e.g., to a floppy disk. The relicensing manager then connects to the license clearing and causes the license count to be decremented (assuming that the user is free to transfer the software an unlimited number of times). The user then installs the relicensing manager and the license certificate on the new machine (in the same manner as described previously). The user then relicenses the software on the new machine by connecting to the license clearinghouse and the publisher. During relicensing, the license count will be incremented back to its previous value as when the software was installed on the previous machine.

For the relicensing manager to obtain the product from the product server, it is essential that the download request be authenticated as valid. Without such authentication, a malicious user who knows the request protocol could obtain illegal copies of software. In one possible embodiment, this authentication is effected as follows: when the relicensing manager sends the request for reinstallation to the clearinghouse, it also sends a unique (or statistically unique) identification of the machine on which it resides. The clearinghouse returns a "ticket", containing a ticket serial number, the name of the software whose download is authorized and the machine ID that is authorized to receive the download and encrypts this information with a secret key shared with the product server. The relicensing manager then presents the machine ID and this ticket to the product server, which decrypts it and checks that the machine ID matches, thereby verifying that the request information is accurate and has not been tampered with.

The requirement of a shared secret between the clearinghouse and the product server can be overcome by a variation, in which the clearinghouse signs the ticket with a private key and the product server verifies it with a public key. In that case, the machine ID is not required, but either the product server or the clearinghouse needs to keep a list of used tickets to avoid a replay attack. If the clearinghouse keeps that list, the product server must present the ticket to the clearinghouse and only commence the download if the clearinghouse has confirmed that the ticket has not previously been used.

In addition to the foregoing functions, preferably the relicensing manager also documents electronic purchases by creating an electronic sales receipt from information in the license file. When an electronic purchase has been made, the relicensing manager queries the user whether the user would like to print out a receipt. Preferably, the receipt includes a verifiable digital signature of the merchant and therefore cannot be forged, as well as a unique license number that can be used to retrieve the electronic license as described previously.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. Using relicensing manager software running on a user machine, a method of relicensing a software product for which an electronic license certificate has previously been received, comprising the steps of:
   storing both current and prior versions of software products in a software product archive at a repository site;
   storing a count of licensed installations for a plurality of different licenses at a license clearinghouse;
   connecting to the license clearinghouse, identifying a specific license, and requesting relicensing;
   software at the license clearinghouse authorizing or refusing relicensing based on a count corresponding to the specific license and specified policies;
   if relicensing is authorized, connecting to the repository and downloading a copy of the software product; and
   reinstalling the software product.

2. The method of claim 1, wherein authorizing comprises the license clearinghouse issuing an electronic ticket received by the relicensing manager software running on the user machine, the method comprising the further step of the relicensing manager software presenting the ticket to the repository.

3. The method of claim 2, comprising the further step of the relicensing manager presenting to the license clearinghouse a machine ID identifying the user machine, the license clearinghouse electronically imprinting the ticket with the machine ID.

4. The method of claim 3, wherein the relicensing manager presents the machine ID to the repository along with the ticket, and the repository compares the machine ID presented to the machine ID with which the ticket is electronically imprinted, the repository allowing download only if a match is found.

5. The method of claim 2, comprising the further steps of:
   storing at one of the license clearinghouse and the repository information concerning what tickets have been previously presented; and
   the repository allowing the download of the software product only if the ticket presented has not been previously presented.

6. The method of claim 5, further comprising the repository performing authentication of the ticket.

7. The method of claim 6, wherein the ticket is encrypted by the license clearinghouse, the method comprising the further step of the repository decrypting the ticket using a secret key shared with the license clearinghouse.

8. The method of claim 6, wherein the ticket is encrypted by the license clearinghouse using a private key of the license clearinghouse, the method comprising the further step of the repository authenticating the ticket using a public key of the license clearinghouse.

9. Using relicensing manager software, a method of transferring a licensed software product for which an electronic license certificate has previously been received from a first machine to a second machine, comprising the steps of:
   storing a count of licensed installations for a plurality of different licenses at a license clearinghouse;
   rendering the software product inoperative on the first machine;
   marking the license as being in transit;
   connecting to the license clearinghouse, identifying a specific license, and requesting transfer;
   software at the license clearinghouse decrementing a count corresponding to the specific license;
   installing the relicensing manager and the license certificate on the second machine; and
   relicensing the software product from the second machine.

10. The method of claim 9, wherein relicensing comprises:
   storing a software product archive at a repository site;
   connecting to the license clearinghouse, identifying a specific license, and requesting relicensing;
   software at the license clearinghouse authorizing or refusing relicensing based on the count corresponding to the specific license;
   if relicensing is authorized, connecting to the repository and downloading a copy of the software product; and
   installing the software product and updating the license.

11. The method of claim 10, wherein authorizing comprises the license clearinghouse issuing an electronic ticket received by relicensing manager software running on the user machine, the method comprising the further step of the relicensing manager software presenting the ticket to the repository.

12. The method of claim 11, wherein the ticket is encrypted by the license clearinghouse, the method comprising the further step of the repository decrypting the ticket using a secret key shared with the license clearinghouse.

13. The method of claim 11, wherein the ticket is encrypted by the license clearinghouse using a private key of the license clearinghouse, the method comprising the further step of the repository authenticating the ticket using a public key of the license clearinghouse.

14. The method of claim 13 comprising the further steps of:

storing at one of the license clearinghouse and the repository information concerning what tickets have been previously presented; and the repository allowing the download of the software product only if the ticket presented has not been previously presented.

15. Using relicensing manager software running on a user machine, a method of relicensing a software product for which an electronic license certificate has previously been received, comprising the steps of:

using the relicensing manager, printing a receipt bearing an identifier; and using the identifier as proof of purchase of the software product.

16. The method of claim 15, wherein using the identifier comprises using the identifier to obtain from a remote computer a copy of the license certificate previously received.

17. The method of claim 15, wherein a characteristic of the identifier makes it difficult or impossible to forge.

18. The method of claim 17, wherein the identifier contains a digital signature of a merchant from which the software product was purchased.

19. Using relicensing manager software, a method comprising the steps of:

storing license information for a plurality of different licenses at a license clearinghouse;

connecting to a merchant site and requesting a refund;

software at the merchant site effecting a refund;

software at the merchant site connecting to the license clearinghouse and communicating occurrence of the refund; and at the license clearinghouse, marking the license as belonging to a product for which the purchase price has been refunded.

* * * * *